Apr. 24, 1923. Re. 15.583
E. H. SAVAGE
TRACK BELT UNIT
Original Filed June 27, 1919
Fig 1.
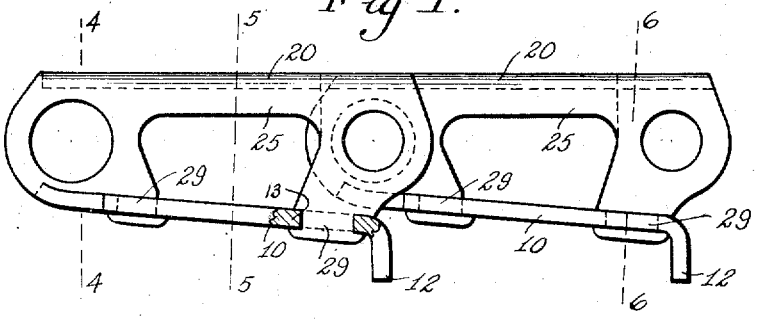
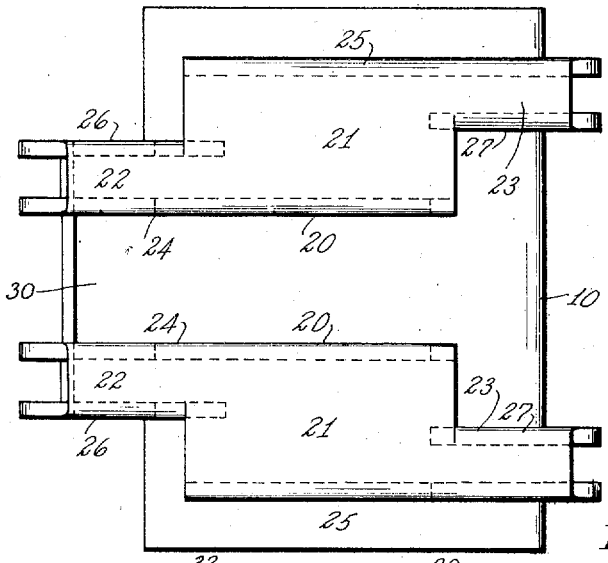
Fig. 2.
Fig. 3.
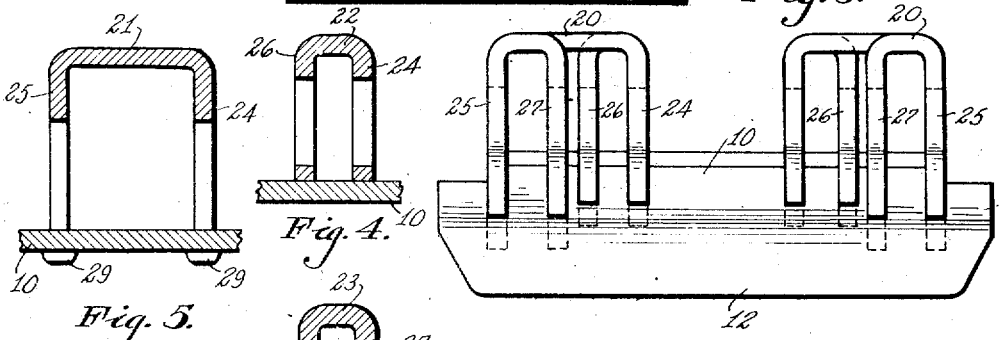
Fig. 4.
Fig. 5.
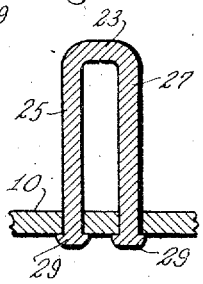
Fig. 6.
INVENTOR
EDWIN H. SAVAGE
BY
Wayne M. Hart.
ATTORNEY Reissued Apr. 24, 1923. Re. 15,583

UNITED STATES PATENT OFFICE.

EDWIN H. SAVAGE, OF CLEVELAND, OHIO, ASSIGNOR TO THE CLEVELAND TRACTOR COMPANY, OF EUCLID, OHIO, A CORPORATION OF OHIO.

TRACK-BELT UNIT.

Original No. 1,330,955, dated February 17, 1920, Serial No. 307,183, filed June 27, 1919. Application for reissue filed January 23, 1922. Serial No. 531,269.

*To all whom it may concern:*

Be it known that I, EDWIN H. SAVAGE, a citizen of the United States, residing at Cleveland, in the county of Cuyahoga and State of Ohio, have invented a certain new and useful Improvement in Track-Belt Units, of which the following is a full, clear, and exact description.

The object of this invention is to produce a cheap but serviceable link track belt for track laying tractors, using for the purpose of plurality of pivoted together built up pressed metal links or units.

The invention resides in the construction and combination of parts substantially as shown in the drawing, and hereinafter described and definitely pointed out in the appended claims.

In the drawings, Figure 1 is a side elevation of two connected track belt units in which the invention is embodied; Fig. 2 is a plan elevation of one of such units; Fig. 3 is a front elevation; and Figs. 4, 5 and 6 are respectively vertical transverse sections through one of the link sides in the planes indicated by line 4—4, 5—5, 6—6 on Fig. 1.

Each link or track belt unit is composed of three pieces, viz, the shoe 10, and the two complementary link side members 20, 20.

The shoe is formed from a rectangular metal plate having a down-turned front end 12 which serves as a ground engaging grouser. The rear end of the shoe is cut away at each side leaving a centrally extending portion 30, which is curved upward. This shoe also has through it numerous slots 13, the purpose of which will be subsequently explained.

In the specific construction shown each of the link sides is made of a single piece of sheet metal which is so cut and bent as to produce a horizontal top member comprising a wide middle portion 21 and two disalined narrow end extensions 22, 23, which project respectively backward and forward from said middle portion, said extensions being so placed that the outer edge of the forward extension is a substantial continuation of the outer edge of the middle portion, and the inner edge of the rearward extension is a substantial continuation of the inner edge of the middle portion. Each of these link sides also includes downwardly turned vertical flanges which are integral with the top member. One of these flanges 24 extends downward along the inner edge of the wide top portion 21, and downward also along the inner edge of the narrow rear extension 22.

Another flange 25 extends downward along the outer edge of the wide middle portion 21, and also along the outer edge of the narrow forward extension 23. The flange 26 extends downward along the outer edge of the narrow rearward extension 22 and the flange 27 extends downward along the inner edge of the narrow forward extension 23. Preferably a considerable part of the flanges 24, 25, that is, the part thereof which extends down from the wide middle top portion 21, have their lower edges cut away as indicated in Fig. 1. These parts of these flanges therefore extend downward only a short distance; but they sufficiently strengthen the wide middle part of the link side to enable it to perform the function of a rail, on which the weight supporting track wheels of the tractor will ride. The stated parts of these flanges are cut away primarily for the purpose of reducing the weight of the links.

As will be seen from Fig. 4, a vertical section through the narrow rear extension 22 of this link takes the form of a narrow inverted flat U. A vertical transverse section in the plane of line 6—6 on Fig. 1, through the narrow front extension 23, has also the form of a narrow inverted flat U, which, however, is not alined with the corresponding parts of the rearward extension. The vertical transverse section on line 5—5 of Fig. 1, through the midde part of the link side, also takes the form of an inverted flat U which on its upper end is substantially twice as wide as the upper ends of the other two U-shaped sections; and the side flanges do not extend down nearly as far.

On the lower edges of the long downwardly extended side flanges, the tongues 29 are formed. These project through the slots 13 in the shoe; and their projecting lower ends are upset against the lower surface of the shoe, thereby securely fastening these link sides to the shoe and holding them firmly down upon the same.

Both link sides are similarly shaped and connected with the shoe. The link sides are placed in parallel position upon the shoe with the extensions in such relative position that the distance between the inside flanges 27 of the forward extensions of the link sides is slightly greater than the distance between the outer surfaces of the two outside flanges 26 of the rearward extensions. The outside flanges 26 are positioned inside of the sides of the rearwardly extending portion 30, of the shoe, and both the forward and rearward rail extensions project beyond the ends of the shoe. The shoe being cut away on each side of the centrally extending rear portion allows the rear extensions of the two link sides of one link to go between the forward extensions of the link sides of the next adjacent link; and may be pivoted thereto by any suitable means,—the overlapping portions of the flanges 24, 25, 26, 27, being perforated for the reception of the pivoting devices. The rear portion of the shoe being curved upwardly gives a clearance between the shoes of adjoining links allowing a free pivoting relation therebetween.

Having described my invention, I claim:—

1. A three piece pressed metal track belt link comprising, in combination, a shoe having longitudinal slots near its side edges, and two link side members, each having on its lower edge a tongue which goes through one of said slots, and has its lower projecting end upset against the lower surface of said shoe.

2. A link belt unit comprising a shoe having slots through it, and link sides, each of which has a flat top member and side flanges which are turned down from said top member, said flanges having tongues on their lower edges which pass through the slots in the shoe and are upset against the lower face of said shoe.

3. A link belt unit comprising a shoe having slots, and two link sides each comprising a wide middle top part having downwardly extended flanges along both side edges and two narrow end portions each of which has downwardly turning flanges along the side edges,—said downturned flanges being formed with tongues which pass through the slots in the shoe and are upset against the lower face of said shoe.

4. In a track belt link, a shoe having slots therein and a link side member, said link side member being formed of a single piece of sheet metal bent to comprise a top member and depending side flanges having portions thereof secured within the slots in said shoe, said side flanges having a portion cut away providing a transverse opening through said link side.

5. In a track belt link, a shoe having slots therethrough, and a link side member comprising a top member and depending flanges having tongues which extend through the slots in said shoe and are secured thereto.

6. In a track belt link, a shoe having longitudinal slots therethrough, and a link side member having tongues projecting through the slots in said shoe and the projecting portion thereof being upset against the lower surface of said shoe.

7. A link belt unit comprising a shoe having slots therein, a link side member formed to comprise a top and depending side flanges, the depending edges of said side flanges bearing upon said shoe, and tongues projecting from said depending side flanges secured within the slots in said shoe.

8. A track link belt unit comprising a shoe, and link side members, each of said link side members being formed of a single piece of sheet metal bent to comprise a top member terminating in narrow disaligned end extensions forming a continuation of one side of said top member, and flanges depending from each side of said top member secured to said shoe, said flanges extending through said shoe and secured therewith.

9. A track link belt unit comprising a shoe, and two parallel link side members, each of said side members comprising a top member terminating in disaligned extensions, and flanges depending from the sides of said top member and said disaligned extensions secured to said shoe, said link side member being relatively arranged with each other whereby, the rear extensions will fit within the forward extensions of an adjoining link, thereby forming a rail of substantially uniform width, and tongues depending from said flanges and secured through said shoe.

10. In a track belt link, a shoe having longitudinal slots therein, and a link side member, said link member having a top member terminating in a narrow extension at each end and flanges depending from the top member and the extensions thereof, said flanges on each side of the top extensions having tongues projecting into and secured in the slots in said shoe.

In testimony whereof, I hereunto affix my signature.

EDWIN H. SAVAGE.